FIG. 1

INVENTOR
NORMAN H. VOGT
BY
ATTORNEY

June 4, 1968               N. H. VOGT             3,386,369
MACHINE FOR CONTROLLED INJECTION OF PICKLE
FLUID IN MEAT PRODUCTS Filed Oct. 26, 1964                       5 Sheets-Sheet 4

INVENTOR
NORMAN H. VOGT

BY
ATTORNEY

United States Patent Office 3,386,369
Patented June 4, 1968

3,386,369
MACHINE FOR CONTROLLED INJECTION OF PICKLE FLUID IN MEAT PRODUCTS
Norman H. Vogt, Clawson, Mich., assignor to Vogt Incorporated, Clawson, Mich., a corporation of Michigan
Filed Oct. 26, 1964, Ser. No. 406,448
18 Claims. (Cl. 99—257)

ABSTRACT OF THE DISCLOSURE

A machine constructed in units for weighing and injecting hams or other products with a pickling fluid. A ham or other product positioned on a tray will impose the weight thereof on a weight strain bridge. The bridge emits a signal directly proportional to the weight of the product and an analog memory system receives the signal. Pump means which is controlled by the system pumps a measured amount of fluid into the product. Upon completion of the pumping the product is ejected from the machine.

---

This invention relates to an automatic meat curing processing machine for injecting curing pickle in meat such as hams, briskets, shoulders, picnic hams, etc.

The novelty and utility of the machine will be understood from the description and disclosure of the structure and operation of a ham pickling machine used as a suitable example.

One process of preparing "smoked ham" in the meat packing industry includes formulating a pickle liquid having the desired salt, spice, flavoring, etc. in a water solution. The ham is butched so that at least one blood vessel, such as the main artery is left intact and preferably extended. This extension of the main artery constitutes a nipple leading to the arterial and vascular system of the ham which extends throughout all the tissues and muscles.

A tube or needle is inserted in the nipple portion of the main artery and the pickle liquid or fluid is pumped into the ham arterial system under pressure. This system of brining, spicing, and flavoring the ham has commercial preference over soaking the hams in baths of pickle brine for long periods of time. The present day injection pickling or brining of hams can be accomplished in a short time compared to soaking. The interval of time in injection depends on the pressure employed in forcing the pickle into the arterial system against encountered resistance.

The tissues, muscles, arteries, and vascular system of the ham provide considerable resistance to the injection and permeation of pickle fluid. For high production operation with a workman controlling injection it is necessary to inject the pickle at pressures up to 100 p.s.i. Otherwise the number of hams that a workman could pickle in a day would not justify his wages, capital equipment, and overhead. While this high pressure produces production capacity, it is too high relative to the ham to produce entirely satisfactory results.

This high pressure jets the pickle fluid into the ham arterial system and strips the cholesterol from the interior walls of the arteries. The cholesterol then plugs the smaller arteries and the vascular duct system of the ham. The arteries may rupture, form blisters of fluid in the muscles, etc. In any event, the pickle is not ideally distributed throughout the ham. Under the high pressure of one hundred p.s.i., the ham is relatively quickly inflated such as a pneumatic tire or a rubber balloon.

The high pressure in manual introduction of liquid or fluid by a workman into a ham is essential to provide a commercial rate of production. In other words, if the pressure were lower, it would take the operator too long to manually inject each ham. Thus at one hundred p.s.i. the operator may pickle two hams a minute whereas if the pressure was reduced to forty p.s.i. he would not be able to pickle more than one ham every minute because of the necessary time required for the brine to permeate the tissues and muscles under the low pressure.

It has been found that pumping a ham over a relatively long period of time with pickle fluid at 40 p.s.i. is ideal as the cholesterol is not stripped, the arteries do not rupture, the fluid does not localize in blisters, and the longer time required to pump in the necessary volume of pickle fluid at the low pressure allows the pickle fluid to flow throughout the ham. This produces an ideally pickled ham.

In the smoking of the ham the smoking process temperature and time is calculated so that it will reduce the ham from its pickle expanded weight back to its normal weight before pickling. Thus it will be understood that if some hams are proportionally under-pickled and some hams are proportionally over-pickled, that an average smoking time for a batch of hams cannot be arrived at so as to produce commercially uniform hams and legally saleable hams.

The pure food laws require that any added weight introduced to a meat product for the purpose of effecting a cure or treatment of the food product must be removed and the product returned to its original weight prior to sale to the public. Thus it is prohibited by law for the meat packer to sell pickle fluid or salt to a customer instead of ham.

The state and federal meat inspection bureaus test the hams for fluid overweight with a nitrogen test which reveals the actual protein to moisture ratio of the ham. The result of this test relative to normal determines the legal saleability of the ham. Thus the inspectors can determine over-hydration easily. When overhydration is found in a ham or hams of a smoked batch, the whole batch is held for further processing.

This results in the fact that the pure food inspectors will not permit the sale of a ham that is heavier after treatment than it was before treatment. If the ham comes from the smoking room below its initial weight prior to treatment, the inspectors will permit the sale of this ham but it constitutes a loss to the meat packer. It is also obvious that if the hams are not proportionally brined, that the flavor will not be uniform from ham to ham in a batch.

The volume of pickle fluid injected in a ham is therefore critical. After the pickle fluid is pumped into the hams, the hams are hung in a smoking room. This finishes the curing of the smoked hams. The smoking room is hot and the ham is dehydrated in the smoking process. The meat packer must coordinate the volume of de-hydration of the ham to the volume of the pickle fluid pumped into the ham to return the ham to its original weight. Each ham in the batch must be increased in weight proportionally so that smoking reduces the weight proportionally.

As the hams are individually pumped and smoked in large batches, it is basic that each ham is dehydrated proportionally to its size in the smoking process. Thus it is critically important to hydrate or pump the ham with pickle fluid proportional to its size in the first place so that it will have proportionally increased, added, or addendum weight to loose in the smoking process. The addendum fluid weight should be accurately proportional to the original weight of the ham in each ham of the batch.

Some attempts have been made to measure the volume of pickle introduced under pressure by placing the ham on a scale and introducing a certain weight of pickle fluid into the ham while it is on the scale so that the ham achieves the desired weight increase. This results in a much improved pickling of the hams but it slows down production to the point that this method substantially commercially defeats itself.

It is therefore a primary object of the invention to provide a high production curing fluid injecting machine for automatically injecting curing fluid into meat products.

An object of the invention is to provide an automatic machine which will add an addendum weight of fluid to the meat product which is proportional to the original weight of the meat product.

An object of the invention is to provide an automatic pickle fluid injecting machine which will introduce the fluid at a relatively low pressure over a relatively long period of time to properly uniformly pickle the meat product without attention from the operator after the meat product is conneced to the machine.

An object of the invention is to provide a machine unit which can be used in a multiple machine bank providing a multistation production line operated by a single operator so that the operator does not stand idle during the cycling of one machine and so that the operator may occupy his time loading the several machines.

An object of the invention is to provide means in the machine which measure the original weight of the meat product placed thereon and which measures a proportional weight of pickle fluid injected into the meat product automatically as it is pumped into the meat product.

An object of the invention is to provide a fluid injecting system for a meat product treating machine which automatically introduces proportional volume or addendum weight of fluid to each piece of meat connected to and positioned on the machine regardless of the weight of the piece of meat.

An object of the invention is to provide means in the machinery selectably changing the proportion of the addendum weight relative to the initial weight so that various addendum proportional weights may be added to a meat product selectively.

An object of the invention is to provide manually selectable variable control of proportional weight of pickle fluid introduced to each ham in a batch so that the pickling of various batches of hams may be varied as desired together with the varying of smoking room time to produce hams of mild, medium, and high flavor curing.

An object of the invention is to provide a signal in the machine as an indication of product initial weight which is converted by the machine to a proportional addendum weight of fluid to be added so that each product when pumped is increased in weight in the introduction of fluid by an accurate proportional weight.

An object of the invention is to provide an automatic cycle in the machine which, upon the operator loading and clamping a product, measures the initial weight, computes the addendum weight, introduces the fluid, measures the total weight, stops fluid injection, unclamps the product, dumps and disconnects the product, and reconditions the machine for the next product.

An object of the invention is to provide the means in the automatic cycle for positioning the brine injection nozzle and clamps in the open position ready for manual connection to a product arterial nipple upon the machine reconditioning itself.

An object of the invention is to provide clamps which are manually closed adjacent the brine nozzle so that upon the operator inserting the nozzle in the product arterial nipple and manually closing the clamps, the closing of the clamps causes the start of the automatic cycle of the machine whereupon the product is weighed for initial weight, the signals converted, the pickle fluid introduced, the clamps opened, and the weighing tray tipped to eject the product and disconnect the nipple from the nozzle, and bring the tray back to the ready position with the clamps open and the cycle of the machine at the start position ready for operation on the next product.

An object of the invention is to provide an ejection tray on the machine which, upon the completion of the pumping of the ham elevates to dump the ham from the machine whereupon the weight of the ham and the unclamped condition of the nozzle permits the ham to disconnect itself from the nozzle when it falls into the hopper.

An object of the invention is to provide a pickle fluid pumping machine for meat products which may be made in multiple units such as four to six or more so that one operator may process products at a high production rate by placing a product on the weighing unit and connecting the nozzle and clamps to the arterial nipple whereupon each machine unit then operates on its own automatic cycle to properly pump and eject the product and recondition itself to the ready position automatically so that the only action required by an operator is to position the product and connect the nozzle and clamps to the nipple enabling the operator to place products on four to six or more machine units with all the units pumping the products accurately, automatically.

An object of the invention is to provide a signal on the machine to designate products unsuitable to be injected, such as where the main artery is ruptured inside the ham closely adjacent the extended nipple portion, and to hold the product in position for manual removal by the operator for other processing such as by stitch-pumping with multiple needles.

An object of the invention is to provide an automatic cut-off in the machine which stops the fluid-pumping of the ham upon the desired proportional weight of fluid being added and a total weight being achieved and which, upon the dropping of the total weight within a short period of time, re-introduces pickle fluid to the ham thereby operating the pumping sequence signal light repeatedly during the repeated pumping operations advising the operator that the machine is pumping a particular product several times thereby notifying the operator that the product is leaking fluid rather than retaining it.

An object of the invention is to provide means for killing bacteria in the pickle fluid line prior to introduction to the ham or other meat product to insure that no harmful bacteria are introduced into the ham with the pickle fluid.

An object of the invention is to provide a machine which is simple in design and construction, inexpensive to manufacture, easy to use, easy to operate, and which maintains itself in accurate operating condition over long periods of time without service requirements, mal-adjustments, or improper operation occurring.

These and other objects of the invention will become apparent by reference to the following description of a meat product fluid pumping machine embodying the invention taken in connection with the accompanying drawings in which:

Reference is now made to the drawings wherein like numerals refer to like and corresponding parts throughout the several views.

The machine constructed in units for weighing and injecting one meat piece on a unit. A bank of units may be disposed in line or placed on a rotating platform or otherwise assembled in multiple as desired. They may be manufactured in separate units in separate cabinets and assembled in side-by-side position or in circular orientation, or several units may be assembled in a common enclosure if desired.

Each unit has an enclosure in which the machine control and operating components are contained. The unit has a top surface. The grid platform or tray member is positioned above the top surface. A ham is used as an example of a piece of meat. The ham to be treated is positioned on the tray. The tray is spaced above the top surface of the unit and is pivotally connected at the back of the unit. A centrally disposed depending leg is fixed on the tray adjacent the front of the tray. This leg bears on support means transferring the load to a strain gage. The rear pivot points of the tray position and locate the tray so as to properly hold the tray with the leg bearing on a strain gage. The ham is placed on the tray approximately above the leg so that the weight of the ham is substantially entirely supported by the leg on the strain gage with the pivot pins merely holding the tray and ham in proper position.

A tray tilting mechanism extends through to top surface of the unit and moves into contact with the bottom of the tray to raise the front of the tray so that the ham slides rearwardly thereon over the pivot points and dumps into a hopper behind the machine unit after the ham has been properly filled with pickle fluid. A hood may be located above the tray. A hose and flexible operating cable may hang from the hood. A clamping nozzle assembly is connected on the end of the hose and cable. The nozzle assembly has an injection needle, holding clamps, and a clamp lever.

Operating the lever on the clamp assembly permits the operator to set the clamps after he has inserted the needle in the nipple portion of the ham artery. The lever actuates the flexible cable to the machine and the automatic cycle of the machine then occurs.

The first phase of the cycle is a three to five second timed delay period during which any vibration in the machine or units is allowed to settle out after the ham has been placed or thrown on the tray or platform and the nozzle connected to the artery. After the time delay has expired, the machine system accepts the strain gage proportional voltage at cut-off as the weight measurement of the initial weight of the ham thereon. The initial weight voltage of the ham is fed to an analog memory system and to a percentage addendum component which has been previously set at the desired addendum percentage voltage output and this is combined with the proportional weight voltage. The analog memory and percentage addendum component circuit voltage determines the total weight including the addendum weight and this is fed to a comparator. The solenoid valve to the fluid pressure system is opened and fluid is fed through the hose and needle into the ham. The fluid preferably is fed at a low pressure such as 40 p.s.i. This allows the brine to permeate the arterial and vascular system of the ham without the danger of rupture, sudden blowout, and over-feeding and allows the fluid to flow throughout the ham without being blocked by cholesterol.

As the brine is fed into the ham, the strain bridge is further loaded by the supporting leg and its load is measured by the weight strain bridge of the system. This measurement is fed to the comparator. Upon the weight strain bridge signalling the comparator that the total weight of the ham including the original and addendum weight has been reached, the feeding of pickle fluid is terminated by closing the solenoid valve.

Upon the termination of feeding of pickle fluid, the machine cycle actuates the flexible cable opening the clamps on the nozzle. The machine cycle operates a tray tipping mechanism which moves upwardly into contact with the bottom of the tray and pivots the tray unwardly at the front on the pivot points at the rear whereupon the ham slides rearwardly into a hopper behind the machine unit, and as the ham falls the nozzle is extracted from the artery. The elevating mechanism then retracts permitting the tray to move downwardly with its leg on the strain gage. The machine is now ready to receive another ham and repeat the operation.

Any time fluid is being pumped into the ham, a light shows on the control panel of the machine. Should the ham achieve its total weight and then lose it through leaking, the machine will then again pump fluid to again achieve the total weight. Upon this occurring repeatedly with the machine attempting to achieve a stable total weight and hold it for a post pump period, the light will flash on and off during the operation. The machine will not dump until the gross weight is maintained for a set time period. This advises the operator that the ham is a leaker and cannot be arterially pumped with fluid. He removes this ham from the tray and puts it in a separate bin and some other process will have to be used to saturate the ham with pickle fluid.

From the foregoing description of a single unit, it will be understood that an operator may place a ham on one unit and connect the nozzle assembly. This starts the machine automatic cycle. He then moves to the next units successively and by the time he has placed four to six hams on four to six machine units, the first unit will have run through its cycle automatically injecting the pickle into the ham, dumping the ham from the tray, and disconnecting the nozzle assembly leaving the machine unit ready to receive another ham. Thus it will be understood that in using a bank of machines, that an operator can operate them as fast as he can put hams on the machine units and connect the nozzles. The machine units do the rest automatically.

Figure 1:
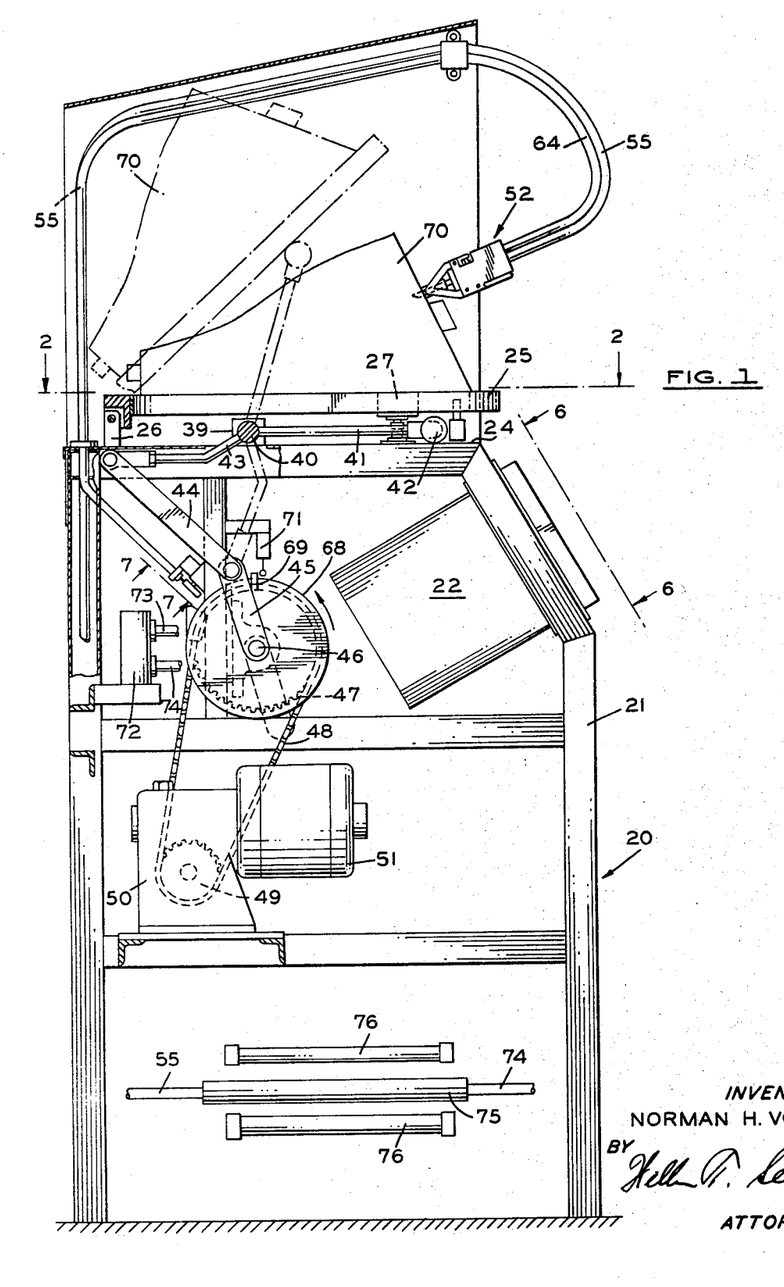
FIG. 1 is a side elevational view of the machine with its side panels removed, partly in cross-section, with a ham on the tray in pumping condition and showing the dump position of the tray and ham in dotted lines.
Figure 2:
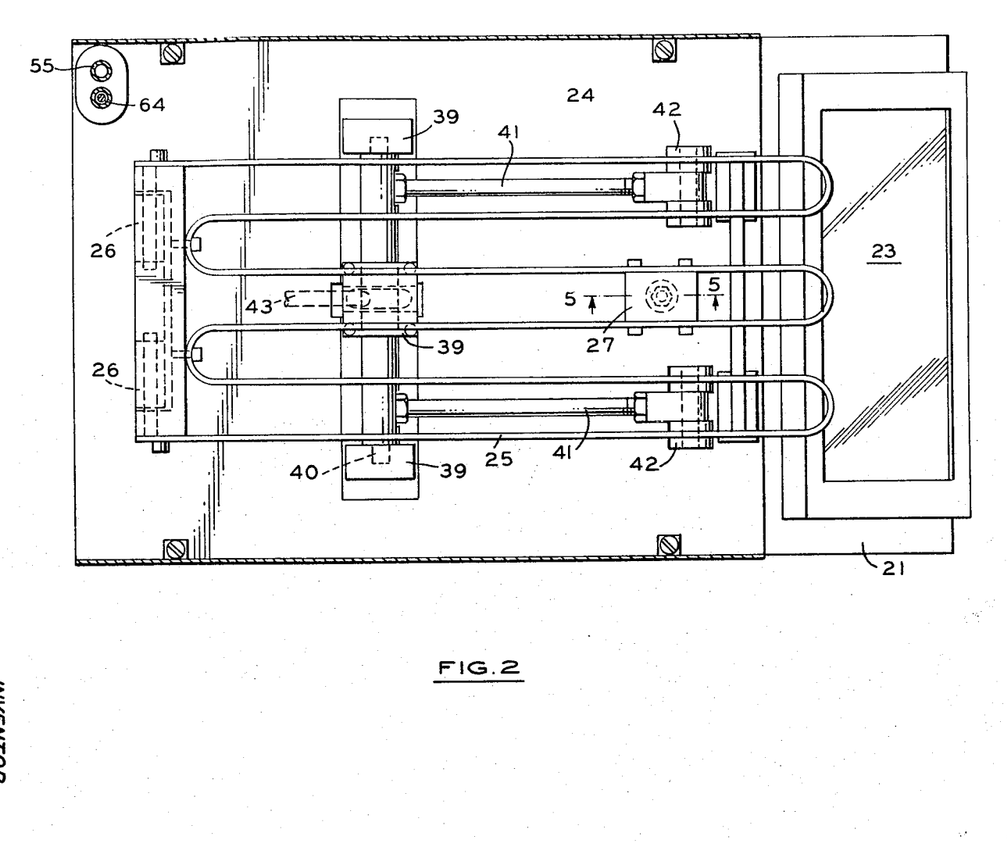
FIG. 2 is an enlarged cross-sectional view of the device of FIG. 1, taken on the line 2—2 thereof, showing detail of the tray construction.

More particularly, a machine unit 20 has a frame 21. A control box 22 is mounted on the frame 21. The control box 22 has a window 23 through which an operator may read indicators on an instrument panel. A top panel 24 fits on the frame 21. The top panel 25 provides a surface which prevents entry of meat particles, juices, and pickle fluid inside the machine. A grid tray 25 lies above the top panel 21. The tray 25 is pivotally mounted at its rear on a pair of posts 26. The tray 25 has a central leg 27. The leg 27 is spaced inwardly from the sides and front end of the tray 25. The leg 27 is adjustable for leveling the tray 25. The leg 27 may comprise a threaded pad 28 on the tray 25, a bolt 29 threaded in the pad 28, and a lock nut 30. The bolt 29 has a polished head bearing on means for transferring the weight of the tray and a load thereon to means for measuring proportional weight.

Figure 5:
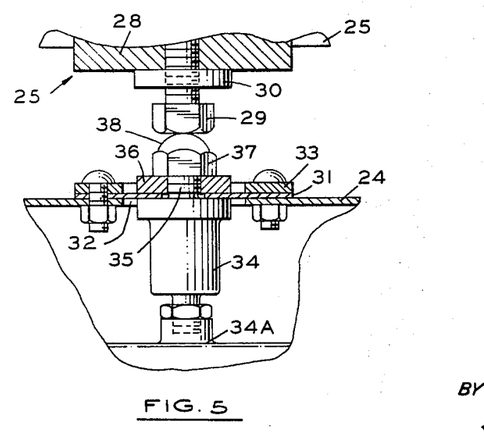
FIG. 5 is an enlarged fragmentary cross-sectional view of FIG. 2 taken on the line 5—5 thereof showing the means for transferring or imposing tray weight on the weight measuring means.

The contact means may comprise a flexible diaphragm 31 overlying an aperture 32 in the top panel 24. A sealing ring 33 seals the diaphragm 31 against the top panel 24. A head 34 lies under the diaphragm 31 and has a neck 35 leading through an aperture in the diaphragm 31. A collar 36 on the other side of the diaphragm 31 opposes the head 34. A cap nut 37 turns on the neck 35 and sealably clamps the diaphragm 31 between the head 34 and the collar 36. The cap nut 37 has a spherical bearing surface 38 upon which the polished head of the bolt 29 rests. The head 34 has a depending stem 34A for contact with a strain bridge later described. The bearing surface 38 and the bolt head 29 are freely separable permitting the tray 25 to be lifted at the front and pivoted or tilted on the posts 26 at the rear of the tray.

Tray tilting mechanism may comprise a pair of bearing blocks 39 on the top panel 24 housing a shaft 40. The shaft 40 has a pair of swing arms 41 fitted with rollers 42 at their outer ends for engaging the bottom of the tray 25. The shaft 40 also has a power arm 43 below the top panel 24. The projecting end of the power arm 43 is pivotally connected to one end of a link 44. The other end of the link 44 is pivotally connected to a crank 45 of a crank shaft 46. A sprocket 47 on the crank shaft 46, a chain 48, a sprocket 49 on a reduction gear box 50, and a motor 51 rotate the crank shaft 46. The home position of weighing and pumping of the tray 25 and its tilting mechanism is shown in solid line in FIG. 1 and the full dumping position is shown in dotted lines. It is to be noted that in the home position of the tray that the rollers 42 do not touch the tray 25. Upon the motor 51 being energized, the angular movement of the crank shaft 46 swings the crank 45 swinging the power arm 43 downwardly. This rotates shaft 40 and swings the lift arms 41 upwardly whereupon the rollers 42 engage the bottom of the tray 25. The motor 51 is energized until the full dump position is achieved and the tray 25 returned to the home position. The motor 51 is energized and de-energized automatically as hereinafter explained in conjunction with the description of the operation of the device.

Figure 3:
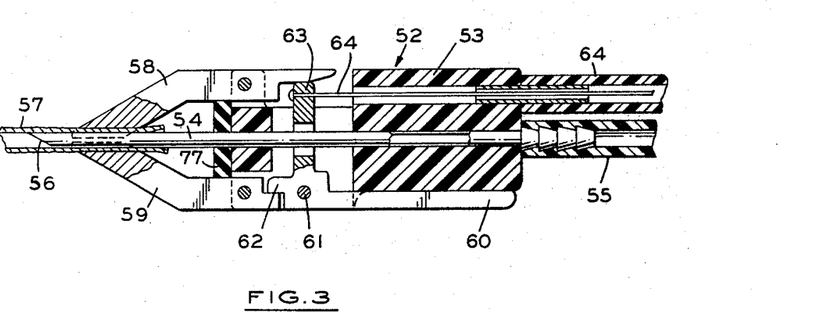
FIG. 3 is an enlarged longitudinal cross-sectional view of the nozzle and clamp assembly of FIG.1 showing the device in the clamped engaged condition on an artery.

The automatically releasing clamping nozzle assembly 52 comprises a stock 53 which houses a hollow needle 54. The back of the needle is connected to a hose 55. The front of the needle has a sharpened beveled point 56 for insertion in an artery 57. A pair of clamping arms 58 and 59 are pivoted on the stock 53 and have outer ends angling toward and engaging the artery 57 surrounding the needle 54. The other ends of the arms 58 and 59 on the other side of their pivot points are engaged by a hand lever 60. The lever 60 is pivoted at 61 in the stock 53 and has an end 62 engaging the clamping arm 59 and a leg 63 engaging the clamping arm 58. A rubber spring 77 abuts the clamping arms 58 and 59 normally urging them outwardly out of clamping relationship.

Figure 4:
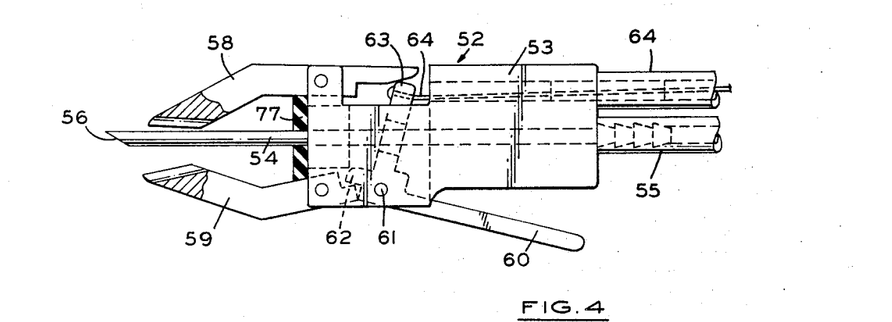
FIG. 4 is a side elevational view of the device of FIG. 3 showing the nozzle and clamp assembly in this disengaged position.

The lever 60 when moved away from the stock 53 releases the clamping arms 58 and 59 and allows them under power of the spring 77 to move away from the needle 54 unclamping the artery 57. A flexible cable 64 is attached to the lever leg 63. A pull on the cable 64 swings the hand lever 60 releasing the clamping arms 58 and 59.

The hand lever 60 when moved toward the stock 53 swings the lever end 62 against the clamping arm 59 and the lever leg 63 against the clamping arm 58 moving bo h into clamping condition against the needle 54. The lever leg 63 locks under the clamping arm 58 and holds the lever end 62 against the clamping arm 59. The clamping arms are thus locked until the hand lever 60 is moved away from the stock 53. This release is effected by the cable 64.

Figure 7:
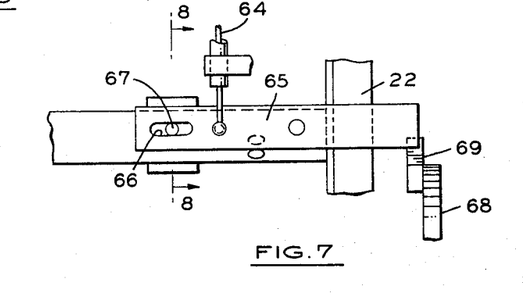
FIG. 7 is an elevational view of the cycle control switch actuating mechanism, partly broken away.
Figure 8:
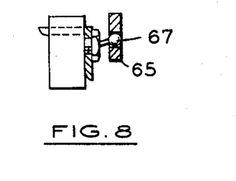
FIG. 8 is a cross-sectional view of FIG. 7 taken on the line 8—8 thereof.

The other end of the cable 64 is attached to a switch and cable actuating lever 65 which is pivotally mounted on the frame 21. The actuating lever 65 has a slot 66 at the cable end engaging a trigger switch 67. The switch 67 is connected in a circuit to start the machine automatic cycle. When the operator closes the hand lever 60 against the stock 53, the lever leg 63 draws the cable 64 swinging the actuating lever 65 placing the switch 67 in the "on" position. Thus the artery is clamped and the machine automatic cycle is started by manually moving the hand lever to the clamping position.

A cam wheel 68 on the crank shaft 46 has a cam 69 for engaging the other end of the actuating lever 65. Immediately upon initiation of the dumping portion of the machine cycle, the cam 69 rides against the other end of the actuating lever 65 swinging the actuating lever 65 to draw the cable 64 and to move the switch 67 to the "off" position. The cable 64 pulls against the hand lever leg 63 and unclamps the clamping arms 58 and 59. The start switch 67 is relocated in the "off" position but lies in an inactive circuit until completion of the ham dumping portion of the cycle, which is now described.

Upon the ham being pumped to the total weight, the components in the control box 22 measure the weight and stop the ham pumping portion and start the ham dumping portion of the cycle. The motor 51 is energized and starts to rotate. Immediately upon motor rotation, the nozzle assembly is unclamped as previously stated. Further rotation of the motor 51 swings the lift arms 41 from their solid line position of FIG. 1 to their indicated dotted line position. This elevates the tray 25 from its solid line position of FIG. 1 to its indicated dotted line position. The ham 70 on the tray 25 slides off and the artery 57 pulls off the needle 54. The motor 51 continues its rotation until the tray 25 and lift arms 41 assume their solid line down positions. As the tray 25 approaches its down position, the cam 69 trips a stop switch 71 and the motor 51 is de-energized. The coast of the motor is such that the cam 69 moves off the stop switch.

The hose 55 connected to the needle 54 is controlled by a solenoid valve 72. Pickle fluid is fed to valve 72 by a pipe 73 at a suitable pressure such as 40 p.s.i. The valve 72 controls flow of pickle fluid to the needle 54 and the ham 70. A hose 74 leads from the valve 72 to one end of a large clear glass tube 75. The other end of the glass tube 75 is connected to the nozzle hose 55. A pair of mercury-vapor germicidal lamps 76 lie on either side of the glass tube 75. The lamps 76 preferably transmit energy at the 2,537 A line. This wave length is very effective in destroying bacteria. Auxilliary equipment to supply the lamps 76 is provided and is substantially the same as used by florescent lamps. As the pickle fluid flows from the valve 72 it passes through the glass tube 75 and is subjected to the rays of the lamps 76. This destroys harmful bacteria in the pickle and insures that only bacteria-free pickle fluid is pumped into the hams. This is very important as otherwise the pickle fluid may have undesirable bacteria.

Figure 9:
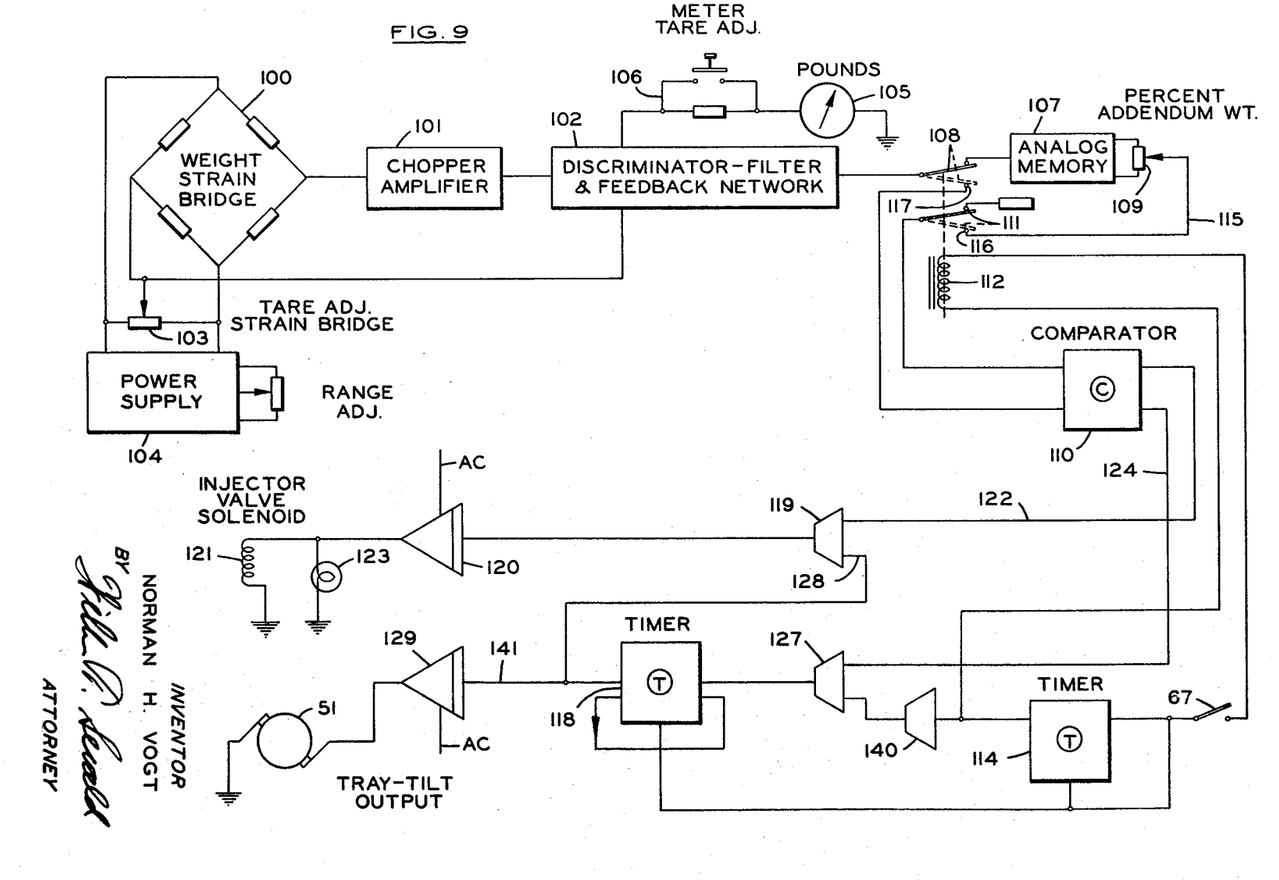
FIG. 9 is a schematic wiring diagram showing the various components and system.

Reference is now made to FIG. 9 wherein a weight strain bridge 100 under a weight load yields a low level direct current voltage output which is proportional to a weight measurement of the load on the tray 25 in terms of voltage. Thus the weight strain bridge 100 measures the proportional weight of a tray load in terms of voltage output. A heavy load produces high voltage and a light load produces low voltages as a proportional measure of the load. The load on the tray 25 is imposed on the weight strain bridge 100 through leg 27, the bolt 29, a cap nut 37, head 34, and stem 34A.

The leg 27 is so located as to be under or close to the center of gravity of a ham on the tray 25 under normal conditions to provide a reasonably accurate output voltage for conversion of this output voltage on an indicator scale calibrated in pounds for visually checking weight loads. This indication may not be accurate ham weight. However, this weight indication is for workman operational checking and not for weighing hams and this calibrated indication is not used at all in the operation of the process and machine because it is not a proportional signal voltage measurement but rather a scaled quantity. This is stated so that it will be understood that the off-center of gravity positioning of a ham does not render the means and system inaccurate as will be understood from the following.

When the center of gravity of one ham is off the leg 27 toward the pivot posts, the leg 27 load bearing on the bridge 100 is lighter. Conversely when the center of gravity of the one ham is off the leg 27 toward the front of the tray, the leg 27 load bearing on the bridge 100 is heavier. Thus for the same ham, the bridge 100 may produce two different voltage signals because of the position of the ham on the tray. But either voltage is a true porportional measurement of the ham in its position on the tray so that any weight added to the ham in that position is also proportional to ham weight with the ham in that position. In other words if a ten pound ham produces a weight strain bridge signal voltage 10% lower than actual weight, to increase the ham weight by 20%, the added weight will also measure 10% lower than actual providing automatic compensation. Conversely if the same ten pound ham produces a weight strain bridge signal voltage 10% higher than actual weight, to increase the ham weight by 20%, the added weight will also measure 10% higher than actual providing automatic compensation. Computing this with a 10 pound ham measured voltage as 9 lbs. and a 20% addendum=9 lbs. plus 20% (or 1.8 lbs.) will be measured thereby adding 1.8 plus .18 or 1.98 lbs. addendum or an accuracy within .01%. Computing this with the 10 pound ham voltage measured as 11 pounds and a 20% addendum=2.2 lbs. minus 10% (or .22 lb.) will be measured thereby adding plus 2.2 lbs. and minus .22 lb. or 1.98 lbs. addendum or an accuracy within .01%.

It can now be understood that with the ham on the tray 25, the weight load imposed by the leg 27 on the weight strain bridge 100 produces an accurate proportional voltage signal that is proportionally accurate relative to percentage increased addendum weight added to the ham and relatively true to the actual weight of the ham and relatively true to the actual weight of the percentage addendum weight well within commercial limits. This will be more clearly understood from the following.

The direct current voltage output of the weight strain bridge 100 is a proportional measurement relative to the actual initial weight of the ham at one time, and then a proportional measurement relative to the combined addendum weight of injected pickle fluid and the initial weight of the ham as the total weight at another time.

The voltage output of the strain bridge 100 is fed to a chopper-amplifier 101 which first converts the low level direct current to alternating current and then amplifies it to a high level. The high level alternating current is fed to a discriminator 102 which has a half-wave filter or rectifier and a suitable feed-back network. The discriminator 102 only yields DC voltage output for one phase of AC input which in turn is only one polarity of DC output from the strain bridge. Discriminator output may be positive with respect to ground. Feedback voltage is derived from the discriminator output and injected in series with the input signal in order to make the DC output voltage a very linear function of strain.

A null or tare adjustment 103 on the strain bridge 100 is connected to the discriminator 102 and allows the discriminator voltage output to be adjusted to zero to compensate for strain bridge 100 unbalance, scale tray 25 unbalance, and chopper-amplifier 101 off-set. A power supply 104 is connected to the strain bridge 100 past the tare or null adjustment 103.

A meter 105 lies in a separate parallel circuit leading from the discriminator 102. A meter tare adjustment 106 for zeroing the meter 105 is provided. The meter 105 is calibrated in pounds and measures the discriminator output voltage to provide an indicated weight of the ham on the tray 25. This reading is not otherwise used as hereinbefore stated.

Figure 6:
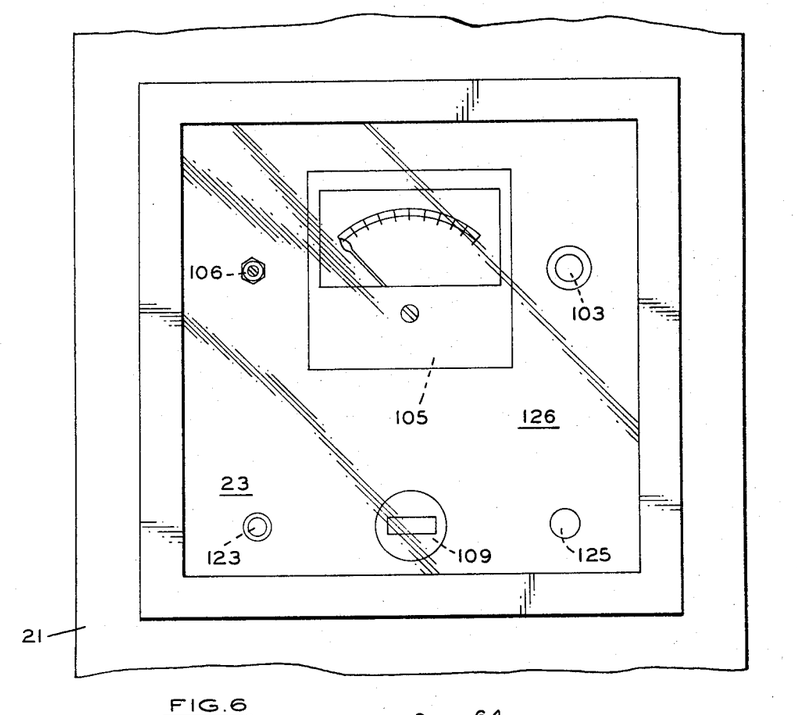
FIG. 6 is an enlarged face elevational view of the machine instrument panel taken on the lne 6—6 of FIG. 1.

The meter 105, tare adjustment 106, null adjustment 103, percentage addendum adjustment 109, warning light 123, and a 5 to 1 meter bias amplifier 125 are positioned on the instrument panel 126.

The voltage output of the discriminator 102 is fed first in the cycle to an analog memory system 107, through a normally closed switch 108. The analog memory system is so integrated that it retains the ham initial weight last voltage signal as an initial weight reference voltage at cut-off. A variably adjustable percentage addendum weight component 109 calculates the addendum percentage voltage on the analog system out-put voltage and amplifies or imposes the addendum voltage on the initial weight reference voltage as a total weight reference voltage. After cut-off to the analog memory system, the combined voltage is fed to a comparator 110 as a total weight reference voltage through a normally open switch 111 when closed after cut-off. The comparator 110 is a high gain differential amplifier and when switched in is normally held with "1" on X to a line 122 and "0" on Y to a line 124. This changes later in the cycle as hereinafter explained.

The solid line indication of the switches 108 and 111 is their normal position described. Thus while there may be analog system and percentage addendum ambient voltages prior to cut-off they are not measured out or fed to the comparator 110 as the closed switch 108 feeds signal voltage to the analog system and percentage addendum component while the open switch 111 prevents their passage to the comparator 110.

The position of the switches 108 and 111 is controlled by a relay 112. The relay 112 is in series with the trigger switch 67 which in turn is actuated by the nozzle clamping lever through the flexible cable. The circuit closed by the trigger switch includes a pre-pump time delay timer 114. This incorporates a time delay after the trigger switch 113 is closed before the circuit is closed by the timer 114 to actuate the relay 112. The timer is adjustable to provide a selectable suitable delay such as three to five seconds after the trigger switch 67 is closed to allow a settling period at the tray 25 after the ham is positioned and the artery clamped. This eliminates ham impact distortion and vibration variation in the strain bridge voltage output.

In the pre-pump delay period, the strain bridge 100, chopper amplifier 101, discriminator 102, analog memory system 107, and percentage addendum component 109 settle down to a constant linear voltage out-put which is retained by the analog memory system at cut-off at the constant level and converted, amplified, or superposed by the percentage addendum component as the total weight reference voltage and this is fed through line 115 to normally open pole 116.

Upon the pre-pump timer 114 timing out the pre-pump period, it closes a switch to the relay 112 and it actuates throwing the switches 108 and 111 to their dotted line indicated position. This cuts off further input to the analog memory system 107 and percentage addendum component 109. Their voltage output now remains constant at cut-off level and their voltage output is fed to one side of the comparator 110 through a line 115 and the switch 111 which is now closed on pole 116. This provides the comparator with the total weight reference voltage at one side thereof.

Also when the relay 112 actuates, the switch 108 closes on pole 117 leading to the other side of the comparator 110. Under this condition the ambient voltage output from the discriminator is fed to the other side of the comparator 110 as the total weight signal voltage. The comparator 110 now measures the signal voltage against the reference voltage and upon the signal voltage balancing the reference voltage at the comparator, it actuates circuits as hereinafter set forth.

When the signal voltage is lower than the reference voltage at the comparator (which is the case upon actuation of relay 112), it feeds current to line 122, through transistor 119, to a relay 120 connecting AC to the coil 121 of the solenoid valve 72 which opens to the hose 55 leading to the nozzle 52 and pickle fluid is injected in the ham 70, on the tray 25. As the pickle fluid is injected in the ham 70, the total weight of the ham 70 increases and the bearing thrust of the leg 27 on the tray 25 increases on the strain bridge 100 increasing its signal voltage output. When the signal voltage output from the discriminator 102 through switch 108 to the comparator 110 rises in value to balance relative to the value of the reference voltage fed to the comparator 110 by the analog memory system 107 and percentage addendum component 109 through switch 111, the comparator switches over and emits current through line 124 through transistor 127 to a post period timer 118 and transistor 119 via line 128. The imposition of this current on the transistor 119 blocking side 128 cuts off current flow through the transistor 119 to the solenoid coil 121 and the solenoid valve 72 closes stopping pickle fluid feed to the ham 70.

Should the ham 70 leak pickle fluid, its total weight lessens and the signal voltage at the comparator drops and the comparator switches back cutting off current to the blocking side 128 of transistor 119 and the solenoid coil 121 is energized and pickle fluids is again pumped to the ham until the total weight signal voltage equals the reference voltage whereupon the comparator switches over and the solenoid valve 72 closes stopping feed of pickle fluid to the ham 70. If the ham continues to leak, the machine will continue to repump the ham.

A lamp 123 is included in the circuit including the solenoid 121. When the circuit is energized with the solenoid 121 energized the valve 72 is open, pickle fluid is being pumped into the ham 70, and the lamp 123 is on. The lamp 123 is positioned behind an instrument panel 124 on the box 22. A red glass lens covers the lamp 123 so that a red light indication appears on the instrument panel when the pumping circuit is energized to pump fluid to the ham 70. Thus when a ham is being pumped with fluid repeatedly because it is leaking, the red light advises the operator and he removes the ham from the tray for other treatment.

Conversely if the ham does not leak but rather retains the pickle fluid pumped into it (which is the usual condition), the signal and reference voltages will stay in balance at the comparator and the solenoid valve will be closed shutting off pickle fluid pressure to the nozzle and the pumping lamp 123 is out.

Since ham leaking is not instantaneous but rather requires a short period of time to register in the total weight signal voltage to the comparator, a post pump or fill period timer 118 controls the circuit to the motor 51 which drives the nozzle unclamping, tray-tilting, ham-dumping, and nozzle disconnecting operations.

The post-pump period timer 118 is connected to the comparator output by the line 124. Upon the signal voltage and the reference voltage balancing at the comparator, the comparator 110 emits current to line 124 through transistor 127 (which is not clear as timer 114 etc. is out) to post period timer 118. This energizes timer 118 to start to time its pre-set period. Should the ham not leak pickle fluid, the timer 118 times out, changes switch contacts and emits current through relay 129 and closes the AC circuit to the motor 51. The motor 51 so energized operates the tray tilting mechanism, etc., as previously described to dump the ham and recondition the machine to process the next ham.

Should the ham leak fluid during the time relay provided by the post pump period timer 118, the comparator switches back and opens the solenoid valve to re-pump the ham and de-energizes the post-period timer 118 and it resets itself for the full post pump period. This may repeat a second or third time and the ham then retain the full addendum weight of pickle fluid without leaking for the post pump period of timer 118. This ham is then dumped as properly processed.

However should the ham after several re-pumpings not maintain its full total weight for the post pump time, the timer 118 will not time out and the ham is not dumped as properly processed. Rather it is retained on the tray as an improperly processed ham and the operator manually removes it and places it aside for special processing or other use.

Closure of the trigger switch initiates the time delay in timer 114. At the end of a preset weighing stabilization time, a "1" appears at the output of timer 114. The "1" at the timer 114 output causes relay 112 to actuate thus shifting the inputs of the comparator to the discriminator output (weight analog) and the analog memory system output which may be starting weight plus percent additive or amplified.

Since the analog memory system output is greater than the actual weight analog, a "0" appears at the comparator output to line 122 and a "1" appears at the output to line 124. Since timer 118 has not timed out, its output is "0". Therefore, two "0's" into transistor 119, causes a "1" at its output. The "1" into the AC switch 120 causes the injector solenoid valve to start brine injection.

During the filling period, a "1" is maintained into the upper transistor 119 input which prevents timer 118 from timing. A "0" is on the transistor 127 lower input since transistor 140 has a "1" on its input after the weighing stabilization time. When the total weight of the ham plus brine reaches the preset percentage increase trigger point, the discriminator 102 output exceeds the analog memory system 107 and component 109 output and causes the comparator 110 output to shift to a "1" at line 122 and a "0" at line 124. The "1" at line 122 shuts off the injector solenoid 121 valve through transistor 119 and AC relay 120 switch. The "0" on line 124 causes timer 118 to start timing. If the ham does not leak for the period of timer 118 preset time, a "1" will appear on the line to AC relay 129 output of timer 118. This will activate the AC relay 129 which activates the tray tilt means. The "1" on line 141 of the timer 118 also locks out further brine injection through transistor 119. A feedback loop around timer 118 locks it in the timed out condition to prevent re-cycling from loss of tray weight due to its tilt action. Both timer 118 and timer 114 are reset by opening of the trigger switch 67 during the tray tilt operation.

If the weight of the ham plus fluid has reduced by leakage of fluid during the timing period, due to leakage large enough to be sufficient to cause the comparator 110 to shift, the "1" on line 122 will again cause the solenoid 121 of injection valve 72 to open for refilling. This process will continue until the total ham weight holds for the preset period or until the operator removes the ham. The blinking red panel lamp 123 signals the operator of the leaking ham. Timer 118 is reset each time the injector valve opens by removal of the input signal from transistor 127.

In the operation of the machine and in the use of the process of the invention it will be understood from the foregoing that one, two, three, four, or more machine units may be used at an installation. The operation of each unit is separate and independent of the other as far as processing a single piece of meat such as a ham is concerned. This provides the user with accurate processing of each individual piece. However the power supply, addendum quantity of material supply such as pickle fluid, and other things in common may be adapted to a bank of machine units. A bank of four machine units may be used with efficiency and is described herein as an example of a bank of units having more or less machines. The operation of a single unit will also be understood from the description of a bank of machine units.

With a bank of four units, the operator connects fluid supply and the power supply. He zeroes the weight indicator meter through the tare adjustment on each unit. This is important as to bridge zero or null value output signal voltage when the tray is unloaded as initial weight signal voltage, the amplified or proportional addendum voltage, the total weight reference voltage, and the total weight signal voltages are dependent for accuracy on bridge zero or null voltage output when the tray is empty. The visual indication of the meter as a measure of weight will also be more accurate but the system and process is not otherwise dependent on the meter. The meter thus serves its purpose in the system and process. The operator also sets the percentage addendum adjustment 109 at the desired percentage of the initial weight to be added to the initial weight. The machine units are now ready to operate automatically.

The operator places a ham on the tray of the first unit in the bank, inserts the needle in the ham artery, and clamps the nozzle assembly on the artery and needle. This starts the automatic cycle of the first unit. The operator then moves to the second, third, and fourth units and does the same operation. He then moves back to the first unit which has completely cycled and the tray is now empty and the first unit has reconditioned itself ready for the next ham. He then repeats his operation at the first unit, then at the second unit, etc. and in this way he is continually performing his operation at each unit successively and continuously with each machine unit processing each ham he places and clamps thereon. Thus a single operator may process one hundred fifty hams per hour or one thousand two hundred hams in an eight hour day with average pressures, cycle time, addendum ratio and ham size as an example. Obviously with smaller hams, smaller addendum ratios, and higher pressures, the machine units will cycle faster and the production rate will be higher. With larger hams and larger addendum ratios, a bank of six or more machine units may be more suitable for a single operator.

Each ham or meat piece is accurately increased in weight by an accurate proportional addendum weight of fluid. This is very important to the meat packer as this gives quality control and also dehydration control in the smoking process so the hams may be smoked in a batch with each ham dehydrating an equal proportional quantity so that every ham in the batch will not only be desired quality but also be legally saleable. The novel machine unit singly and in a multiple unit bank therefore provides a meat packer with a commercially efficient production rate and quality control, and meat treating process not heretofore available.

The invention provides an automatic fluid pumping machine for meat products which delays measuring the weight of a product for a time period to avoid impact and vibration inaccuracies, which then measures the weight of the product for initial weight in terms of a voltage signal, which stores the voltage signal as the initial weight reference voltage, which computes a percentage addendum weight of fluid to be pumped into the products as a percentage of the initial weight reference voltage in terms of a voltage signal, which adds the addendum weight voltage signal to the initial weight voltage reference as a total weight reference voltage, which stores the total weight reference voltage, which pumps the fluid into the product and measures the product for pumped weight in terms of a pumped weight voltage signal, which measures the pumped weight voltage signal against the total weight reference voltage, which stops pumping fluid upon the pumped weight voltage signal balancing the total weight reference voltage, which continues to measure the balance between the pumped weight voltage signal and the total weight reference voltage for a time period, which under unsuitable product conditions repeatedly repumps the product with fluid upon the balance failing to maintain equilibrium because of fluid leaking from product, which indicates an improperly pumped defective product to the operator and retains the defective product, which under suitable product conditions after measuring equilibrium for the time period ejects the properly pumped product, and which reconditions itself for the next product to be pumped.

Although but a single example of the machine has been described in detail as illustrative of the novel machine unit or units, it is obvious that many changes may be made in the size, shape, detail, and arrangements of the various elements of the machine within the scope of the appended claims.

I claim:

1. A machine for adding a quantity of fluid proportional to the weight measurement of a piece of meat automatically comprising,
   a weight strain bridge,
   a tray for holding said piece having a leg bearing on said bridge;
   said bridge emitting a signal voltage proportional to the weight measurement of said piece on said tray bearing on said bridge at one time and the weight of said piece and added quantity at another time,
   an analog memory system storing said signal voltage of said piece at one time as the initial weight reference voltage at cut-off,
   a percentage voltage increase component fed by said system increasing said initial weight reference voltage by a voltage value equal to the addendum weight measurement in fluid to be added to the piece and emitting said increased voltage as the total treated weight measurement of piece and added quantity reference voltage,
   a comparator having balancing first and second sides receiving said total weight reference voltage on a first side at cut-off,
   a relay having switch means switching said bridge voltage output to said second side of said comparator and also cutting off said analog memory system from said bridge leaving said total weight reference voltage output at a constant value and also switching said total weight reference voltage output from said system and component to said first side of said comparator,
   solenoid valve means actuated by said relay to supply fluid under pressure to said piece;
   said bridge signal voltage output under the total weight of piece and fluid increasing in value at said bridge to said comparator second side as fluid is supplied to said piece until said signal voltage is proportional to weight measurement of both piece and desired quantity of fluid supplied to said piece whereupon said bridge signal voltage is equal to said reference voltage at said comparator first side;
   said comparator upon said reference and signal voltages balancing closing said solenoid valve terminating fluid feed to said piece.

2. In a machine as set forth in claim 1, said means for actuating said relay comprising,
   a start circuit including said relay,
   a manually operated trigger switch in said start circuit,
   and a pre-fluid supply period timer in said start circuit holding said start circuit open until a pre-fluid supply time delay period expires providing a time period after the tray is loaded with a piece to permit said bridge output signal voltage to stabilize at a constant linear value;
   after said time delay, said timer closing said start circuit actuating said relay.

3. In a machine as set forth in claim 1, a nozzle having manually closed clamping means, a start, circuit, a trigger switch in said start circuit, and connecting means from said clamping means to said trigger switch;
   said clamping means and said connecting means closing said trigger switch when clamped.

4. In a machine as set forth in claim 1,
   a germicidal lamp,
   means powering said lamp, and
   means exposing the fluid being pumped to said lamp for killing bacteria in the fluid.

5. In a machine as set forth in claim 1, a warning lamp, and
   a solenoid valve circuit including said lamp;
   said lamp apprising an operator that said piece is being supplied with fluid when said solenoid is actuated.

6. In a machine as set forth in claim 1 means for tilting said tray to dump said piece after treatment,
   a dump circuit for actuating said means for tilting said tray, said comparator upon balancing said total weight signal and reference voltage energizing said dump circuit to actuate said means for titling said tray to dump said treated piece therefrom.

7. In a machine as set forth in claim 6, a post pump time delay period timer in said dump circuit normally holding said dump circuit open, said comparator upon balancing said reference and signal voltage energizing said timer to time out a post fluid supply delay period and to then close said dump circuit to actuate said means for tilting said tray to dump said treated piece therefrom.

8. In a machine as set forth in claim 7, said comparator, during the post pump time delay period provided by said post pump period timer, upon said signal voltage falling in value below said reference voltage because of total weight lessening due to leaking of fluid from said piece, switching back deenergizing said post pump period timer;

and said comparator in switching back energizing said solenoid valve coil circuit to again open said valve to repump fluid to said piece.

9. In a machine as set forth in claim 8, said post pump period timer having an automatic reset element which resets said timer for the full post pump period upon said timer being deenergized.

10. In a machine as set forth in claim 8, a warning lamp in said solenoid circuit lighted when said solenoid circuit is energized advising an operator when said piece is being pumped and when said piece is being repumped.

11. A machine for adding a quantity of fluid proportional to the weight measurement of a piece of meat automatically comprising, a weight strain bridge, a tray for holding said piece having a leg bearing on said bridge;

said bridge emitting a signal voltage proportional to the weight measurement of said piece on said tray bearing on said bridge at one time and the weight of said piece and added quantity at another time, an analog memory system storing said signal voltage of said piece at one time as the initial weight reference voltage at cut-off, a percentage voltage increase component fed by said system increasing said initial weight reference voltage by a voltage value equal to the addendum weight measurement in fluid to be added to the piece and emitting said increased voltage as the total treated weight measurement of piece and added quantity reference voltage, a comparator having balancing first and second sides receiving said total weight reference voltage on a first side at cut-off, a relay having switch means switching said bridge voltage output to said second side of said comparator and also cutting off said analog memory system from said bridge leaving said total weight reference voltage output at a constant value and also switching said total weight reference voltage output from said system and component to said first side of said comparator, solenoid valve means actuated by said relay to supply fluid under pressure to said piece;

said bridge signal voltage output under the total weight of piece and fluid increasing in value at said bridge to said comparator second side as fluid is supplied to said piece until said signal voltage is proportional to weight measurement of both piece and desired quantity of fluid supplied to said piece whereupon said bridge signal voltage is equal to said reference voltage at said comparator first side;

said comparator upon said reference and signal voltages balancing closing said solenoid valve terminating fluid feed to said piece;

means for actuating said relay comprising, a start circuit including said relay, a manually operated trigger switch in said start circuit, a pre-fluid supply period timer in said start circuit holding said start circuit open until a pre-fluid supply time delay period expires providing a time period after the tray is loaded with a piece to permit said bridge output signal voltage to stabilize at a constant linear value;

after said time delay, said timer closing said start circuit actuating said relay;

a nozzle having manually closed clamping means, a start circuit, a trigger switch in said start circuit, and connecting means from said clamping means to said trigger switch;

said clamping means and said connecting means closing said trigger switch when clamped;

means for tilting said tray to dump said piece after treatment, a dump circuit for actuating said means for tilting said tray;

said comparator upon balancing said total weight signal and reference voltage energizing said dump circuit to actuate said means for tilting said tray to dump said treated piece therefrom; and a post pump time delay period timer in said dump circuit normally holding said dump circuit open;

said comparator upon balancing said reference and signal voltages energizing said timer to time out a post fluid supply delay period and to then close said dump circuit to actuate said means for tilting said tray to dump said treated piece therefrom.

12. A machine for adding a quantity to a mass which is directly proportional to a measurement equaling the weight of the mass comprising, a tray for holding the mass and the added quantity, a weight strain bridge, a leg on said tray bearing on said bridge;

said bridge emitting a signal voltage directly proportional to the weight load on said tray such as the weight of the mass alone at one time and the mass combined with any added quantity at another time as the case may be;

means amplifying, filtering, and discriminating said bridge voltage as a linear signal voltage output, a power supply to said bridge and said means, a tare adjustment between said power supply and said bridge for adjusting said linear signal voltage to zero when said tray is empty, a relay having normally open and closed switch means changing position upon said relay being actuated, an analog memory system normally connected by said switch means to receive said signal voltage and capable of maintaining the value of said signal voltage at its output and after cut-off, a percentage voltage increase component connected to said analog memory system output increasing the voltage to a value including the increase in voltage proportional to the weight of the quantity to be added to the mass on said tray and having an output transmitting said increased voltage as the total weight reference voltage of mass and added quantity, a voltage comparator having first and second input sides and first and second output sides, a circuit leading from said percentage voltage increase component output to said first input side of said comparator through one said normally open switch means of said relay, a circuit leading from said linear signal voltage output to said second side of said comparator through one said normally open switch means of said relay, feeding means for gradually adding a quantity to a mass on said tray, a solenoid controlling said feeding means connected to said comparator first output side, a normally open start switch, a start circuit including said relay coil and said start switch, said bridge linear output signal voltage upon the mass being placed on said tray emitting to said analog memory system at a level proportional to the weight of the mass;

closing said start switch with said mass on said tray actuating said relay opening its normally closed switch means to said analog memory system leaving said panel at a voltage level output at cut-off proportional to the mass on said tray; closing said normally open switch means connecting said percentage increase component output reference voltage to said comparator first input side; and closing said normally open switch means connecting said bridge output signal voltage to said comparator second input side;

said comparator when said reference voltage exceeds said signal voltage actuating said solenoid coil to operate said feeding means whereupon quantity is added to the mass;

said strain bridge increasing its linear voltage level output as quantity is added to the mass so that the signal voltage at said comparator rises in value as quantity is added;

upon said signal voltage balancing said reference voltage at said comparator, said comparator actuating said solenoid coil to stop feeding quantity to the mass, upon the stopping of feeding of quantity to the mass on said tray, the weight measurement of quantity and mass is increased proportionally to the initial weight of the mass.

13. In a machine as set forth in claim 12, a germicidal lamp, means powering said lamp, and means exposing the quantity being added to the mass to said lamp for eliminating bacteria in the quantity.

14. In a machine as set forth in claim 12, a time delay timer in said start circuit actuated to start timing a pre-quantity supply delay period upon said start switch being closed and having normally open switch contacts interrupting power to said relay;

said timer upon timing out closing said contacts to said relay;

said timer providing a period after said tray is loaded with a mass to permit said signal voltage to said analog memory system to stabilize prior to cut-off when said relay is actuated.

15. In a machine as set forth in claim 12, means for tilting said tray to dump said mass and added quantity, a normally open circuit from said comparator second output side to said means for tilting said tray;

said comparator upon measuring said signal voltage as equal to said reference voltage closing said circuit to said means for tilting said tray to automatically dump said mass and added quantity.

16. In a machine as set forth in claim 15, a post period delay timer in said circuit to said means for tilting said tray holding said circuit open for a period of time after said comparator measures a balance between said signal and reference voltages so that if said comparator during the delay period measures an unbalance due to loss of added quantity, it may de-energize said second output to said circuit to said means for tilting said tray and energize said first output side to said solenoid to add more quantity of said mass.

17. In a machine as set forth in claim 1, a post pump time delay period timer in said pump circuit activated upon termination of pump to time a period after pumping for allowing said signal voltage to fall below said reference voltage due to loss of weight occasioned by leaking of fluid from the piece, said comparator during the post pump time delay period provided by said post pump period timer, upon said signal voltage falling in value below said reference voltage because of total weight lessening due to leaking of fluid from said piece, switching back deenergizing said post pump period timer;

and said comparator in switching back energizing said solenoid valve coil circuit to again open said valve to re-pump fluid to said piece.

18. In a machine as set forth in claim 17, said post pump period timer having an automatic reset element which resets said timer for the full post pump period upon said timer being denergized.

References Cited

UNITED STATES PATENTS

| 2,088,257 | 7/1937 | Beisser | 99—256 |
| 2,234,686 | 3/1941 | Walter | 99—256 |
| 2,581,205 | 1/1952 | Reilly | 99—256 |
| 2,605,695 | 8/1952 | Campbell | 99—256 |
| 2,668,493 | 2/1954 | Moss et al. | 99—256 |
| 2,728,285 | 12/1955 | Bradley et al. | 99—256 |
| 2,755,731 | 7/1956 | Hensgen et al. | 99—256 |
| 2,812,705 | 11/1957 | Zillie | 99—256 |
| 2,915,958 | 12/1959 | Rice | 99—257 |
| 2,993,429 | 7/1961 | Prohaska | 99—257 |
| 3,240,146 | 3/1966 | Schrevder | 99—256 |

BILLY J. WILHITE, *Primary Examiner.*